(12) United States Patent
Moon et al.

(10) Patent No.: US 7,346,074 B2
(45) Date of Patent: Mar. 18, 2008

(54) COMMUNICATION SYSTEM, SIGNAL RECEIVING DEVICE, SIGNAL TRANSMITTING DEVICE, AND COMMUNICATION METHOD

(75) Inventors: Sung Uk Moon, Yokosuka (JP); Minami Ishii, Yokohama (JP); Takehiro Nakamura, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 705 days.

(21) Appl. No.: 10/675,959

(22) Filed: Oct. 2, 2003

(65) Prior Publication Data

US 2004/0066843 A1 Apr. 8, 2004

(30) Foreign Application Priority Data

Oct. 3, 2002 (JP) ............................. 2002-291572

(51) Int. Cl.
*H04J 3/16* (2006.01)
(52) U.S. Cl. ...................................... 370/465; 370/342
(58) Field of Classification Search ................ 370/204, 370/465, 537, 539, 342; 455/102, 103, 132, 455/504
See application file for complete search history.

(56) References Cited

U.S. PATENT DOCUMENTS

| | | | |
|---|---|---|---|
| 5,267,021 A | 11/1993 | Ramchandran et al. | |
| 5,781,542 A | 7/1998 | Tanaka et al. | |
| 6,188,670 B1 | 2/2001 | Lackman et al. | |
| 6,301,558 B1 | 10/2001 | Isozaki | |
| 6,337,881 B1 | 1/2002 | Chaddha | |
| 6,490,243 B1 * | 12/2002 | Tanaka et al. | 370/216 |
| 7,043,210 B2 * | 5/2006 | Zhu et al. | 455/102 |
| 2001/0012322 A1 | 8/2001 | Nagaoka et al. | |
| 2002/0126698 A1 | 9/2002 | Deshpande | |

(Continued)

FOREIGN PATENT DOCUMENTS

EP 0 589 709 A2 3/1994

(Continued)

OTHER PUBLICATIONS

Wei Zhao, et al., "Efficient Adaptive Scaling and Streaming of Layered Multimedia in Heterogeneous Environment", IEEE International Conference on Multimedia Computing and Systems, XP 10519418, Jun. 7, 1999, vol. 2, pp. 377-381.
R. Schafer, "Terrestrial Transmission of DTVB Signals—The European Specification", IEE International Broadcasting Convention, 1995, XP 6528910, Publication No. 413, pp. 79-84.

(Continued)

*Primary Examiner*—Nguyen T. Vo
(74) *Attorney, Agent, or Firm*—Oblon, Spivak, McClelland, Maier & Neustadt, P.C.

(57) ABSTRACT

A communication system is disclosed that is capable of reducing data delay in transmitted hierarchized data and selecting predetermined data from the transmitted hierarchized data for communication according to conditions of the receiving end. The communication system includes a signal transmitting device that hierarchizes data to be transmitted and transmits the hierarchized data, and a signal receiving device that receives the data from the transmitting device. The signal transmitting device includes a hierarchized data transmitting unit that hierarchizes the data to be transmitted into a number of layers and transmits the data layers. The signal receiving device includes a layer identifying unit that identifies the data layers transmitted from the signal transmitting device, and a hierarchized data receiving unit that selects the identified data layers according to at least one of receiving capability and a propagating environment of the signal receiving device, and receives the selected data layers.

2 Claims, 6 Drawing Sheets

U.S. PATENT DOCUMENTS

| | | | |
|---|---|---|---|
| 2002/0172166 A1* | 11/2002 | Arslan et al. | 370/317 |
| 2004/0063406 A1* | 4/2004 | Petrus et al. | 455/67.11 |
| 2004/0066844 A1* | 4/2004 | Moon et al. | 375/222 |

FOREIGN PATENT DOCUMENTS

| | | |
|---|---|---|
| EP | 0 673 131 A2 | 9/1995 |
| EP | 0 732 832 A1 | 9/1996 |
| JP | 6-328866 | 11/1994 |
| JP | 9-23207 | 1/1997 |
| JP | 10-32557 | 2/1998 |
| JP | 11-66085 | 3/1999 |
| JP | 2000-67223 | 3/2000 |
| JP | 2001-45098 | 2/2001 |
| JP | 2002-507358 | 3/2002 |
| JP | 2002-217963 | 8/2002 |

OTHER PUBLICATIONS

Chee-Siong Lee, et al., "OFDM-Based Turbo-Coded Hierarchical and Non-Hierarchical Terrestrial Mobile Digital Video Broadcasting", IEEE Transactions on Broadcasting, XP 11006116, Mar. 2000, vol. 46, No. 1, pp. 1-22.

Yiyan Wu, et al. "Comparison of Terrestrial DTV Transmission Systems: The ATSC 8-VSB, The DVB-T COFDM, and the ISDB-T BST-OFDM", IEEE Transactions on Broadcasting, XP-011006128, vol. 46, No. 2; Jun. 2000, pp. 101-113.

Fumiaki Minematsu, et al. "Transmission System for Multimedia Services in Satellite Broadcasting Channels", IEEE Transactions on Consumer Electronics, XP-011083643, vol. 44, No. 3, Aug. 1998, pp. 556-563.

Chris Nokes, et al. "Potential Benefits of Hierarchical Modes of the DVB-T Specification", IEE Colloquium on Digital Television, XP-006500685, Mar. 16, 1999, pp. 10/1-10/6.

* cited by examiner

FIG.4A TRANSMITTING DEVICE

FIG.4B RECEIVING DEVICE

COMMUNICATION SYSTEM, SIGNAL RECEIVING DEVICE, SIGNAL TRANSMITTING DEVICE, AND COMMUNICATION METHOD

BACKGROUND OF THE INVENTION

1. Field of the Invention

The present invention relates to a communication system, a signal receiving device, a signal transmitting device, and a communication method, in particular, to a communication system in which data hierarchized at the signal transmitting end are received at the signal receiving end after data layers to be received are selected according to receiving ability at the signal receiving end, a signal receiving device, a signal transmitting device in the communication system, and a communication method thereof.

2. Description of the Related Art

Digital modulations are employed in recent radio communications such as cellular phone communication systems or BS (Broadcasting Satellite) television broadcasting systems. Among the digital modulation schemes, QPSK (Quadrature Phase Shift Keying) and 16 QAM (sixteen-position Quadrature Amplitude Modulation) are typical ones used in digital mobile communications.

Figure 5:
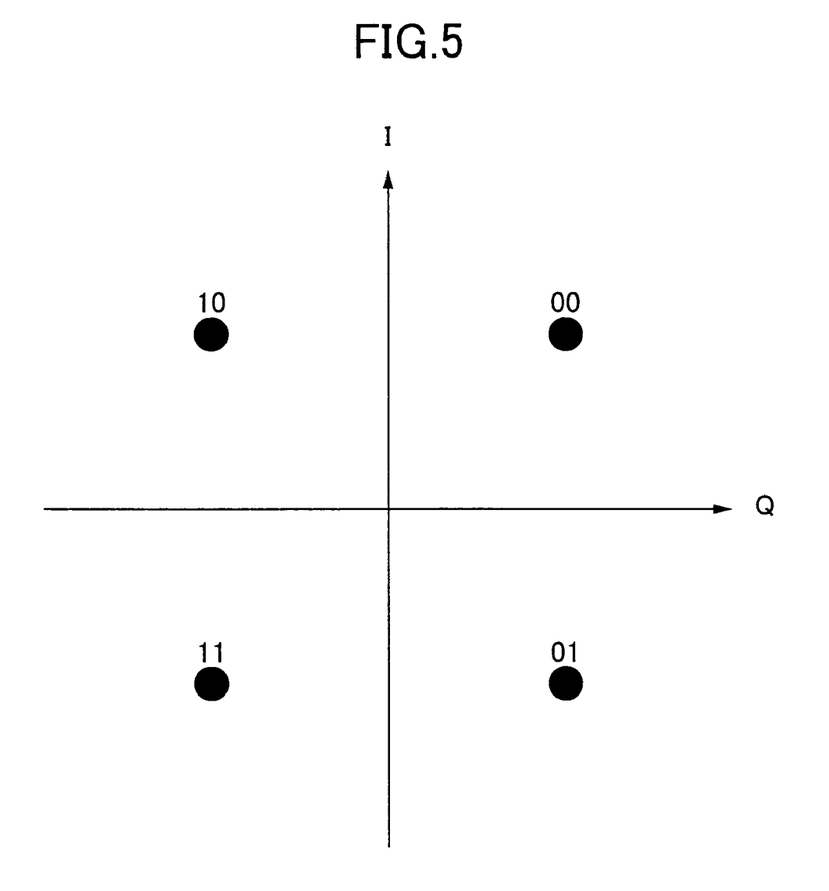
FIG. 5 is a signal space diagram showing the amplitude and the phase of the carrier in QPSK.

In the QPSK modulation scheme, the phase of the carrier is varied to represent more digital data states, and each symbol consists of two bits representing four phase states. FIG. 5 is a signal space diagram (also called phase diagram) showing the amplitude and the phase of the carrier in QPSK, where the I (In-Phase) axis represents the in-phase component, and the Q (Quadrature) axis represents the quadrature component, namely, the component 90 degrees phase-shifted from the reference axis I.

As shown in the signal phase diagram in FIG. 5, phases of the QPSK modulated carrier are located at the vertices of a square. QPSK allows the transmission of two bits of digital data in four phase states (00, 10, 11, and 01) with the phase positions of the carrier at 45, 135, 225 and 315 degrees, respectively.

A derivative of the above QPSK is π/4 shift-QPSK, which is used in a PDC (Personal Digital Cellular) cellular phone communication system, known as the second generation mobile communication system. In π/4 shift-QPSK, the phase positions of the carrier are shifted by π/4 relative to the corresponding phase positions in QPSK. π/4 shift-QPSK also allows the transmission of two bits of digital data in four phase states.

In addition, IMT-2000 (International Mobile Telecommunication-2000), known as the third generation mobile communication system, uses W-CDMA as the radio access scheme, and in the FDD mode of the W-CDMA scheme, BPSK (Binary Phase Shift Keying) is used in uplink data modulation, and QPSK is used in downlink data modulation. On the other hand, in the TDD mode of the W-CDMA scheme, QPSK is used in both uplink and downlink data modulations.

16 QAM varies both the amplitude and the phase of the carrier wave to represent more digital symbol points and thus more bits of digital data, allowing the transmission of four bits of digital data in sixteen phase states in each symbol.

Figure 6:
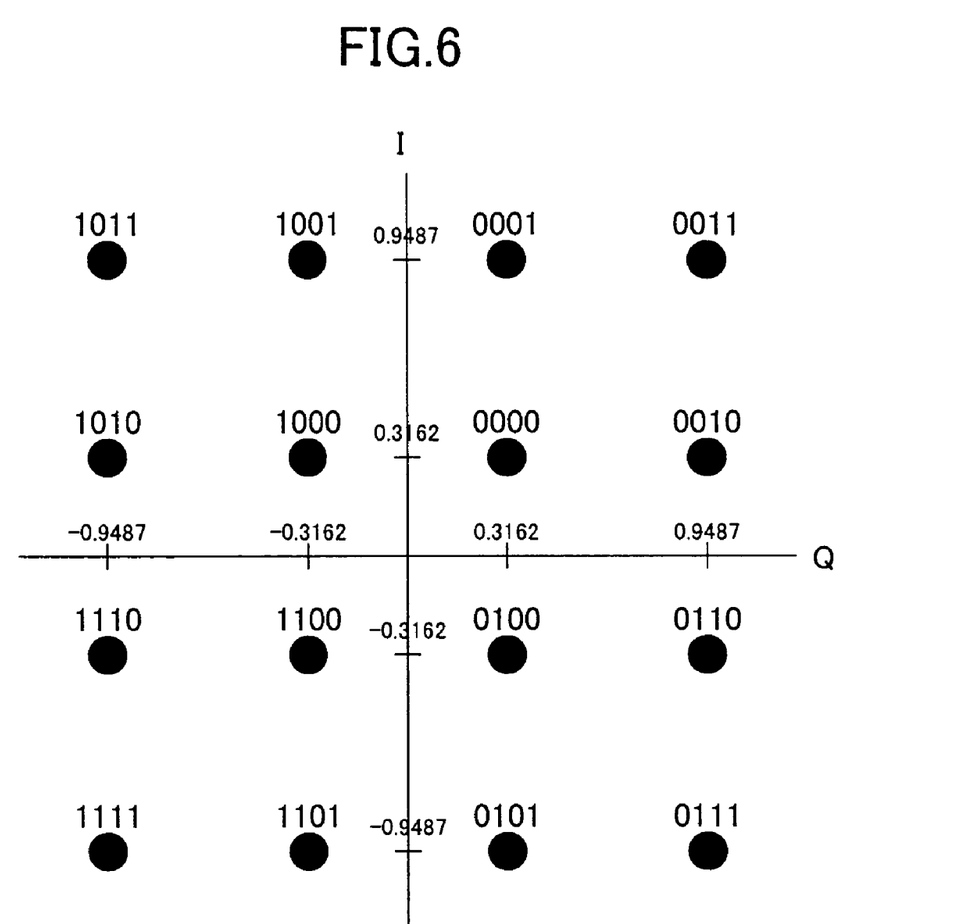
FIG. 6 is a signal space diagram showing the amplitude and the phase of the carrier in 16 QAM.

FIG. 6 is a signal space diagram showing the amplitude and the phase of the carrier in 16 QAM, where numerals 0.9487, 0.3162, −0.3162, and −0.9487 indicate scales of I axis and Q axis.

In 16 QAM, the four bits in each symbol are divided into two groups each consisting of two bits. Combining the variation of the values of the two bit groups with the variation of the amplitude, sixteen symbol points are obtained, as illustrated in FIG. 6. Compared with the above QPSK at the same bit rate, the bandwidth occupied by 16 QAM is narrower than that of QPSK, and 16 QAM is more efficient in high speed digital data transmission using a narrow bandwidth, but is weak against fading (change of strength of the electrical wave due to change of time or the distance between the transmitter and the receiver). The above 16 QAM is used in digital MCA (for public radio service) and others.

As described above, QPSK and 16 QAM are typical digital modulation schemes used in digital mobile communications, and are used for transmission of hierarchized data together with another digital modulation scheme 64QAM.

In order to hierarchize data, for example, additional data for identifying data layers may be utilized. In this method, data and the additional data representing data layer classification are transmitted from a transmitter, and at a receiving end, the received signal is classified, and a user may use or extract desired information included in the received signal by making simple selection by using the additional data.

For example, Japanese Laid Open Patent Application No. 11-66085 discloses such a communication method.

In the above technique of the related art, the receiving ability of the receiving end is not considered. For this reason, when the receiving ability of the receiving end degrades relative to transmitting ability of the transmitting end, the utilization of the processing unit of the receiver (for example, CPU) rises, and data delay increases; consequently, communication quality is degraded.

In addition, in the case in which the transmitting device is a base station and the receiving device is a mobile station, the mobile station is weak against fading, and this is the environmental problem of a mobile communication system. The above prior art technique doe not take the influence of fading into account. For this reason, in the related art, communications are apt to be interrupted due to fading, and the communication quality is degraded.

SUMMARY OF THE INVENTION

Accordingly, it is a general object of the present invention to solve one or more problems of the related art.

A more specific object of the present invention is to provide a communication system capable of reducing data delay in transmitted hierarchized data, and selecting predetermined data from the transmitted hierarchized data for communication according to conditions of a receiving end; and a signal receiving device and a signal transmitting device in the communication system, and a communication method thereof.

According to a first aspect of the present invention, there is provided a signal receiving device for receiving data hierarchized by a signal transmitting device, the signal receiving device comprising: a layer identifying unit configured to identify data layers transmitted from the signal transmitting device; and a hierarchized data receiving unit configured to select at least one of the identified data layers according to a criteria including at least one of a receiving buffer size of the signal receiving device, calculating capability of the signal receiving device, and a propagating environment characteristic of the signal receiving device, and to receive the selected data layers.

Preferably, the hierarchized data receiving unit comprises a selection unit configured to select one or more of the receiving buffer size of the signal receiving device, the calculating capability of the signal receiving device, and the propagating environment of the signal receiving device for selecting the identified data layers.

According to a second aspect of the present invention, there is provided a signal transmitting device for hierarchizing data to be transmitted and transmitting the hierarchized data, the signal transmitting device comprising a hierarchized data transmitting unit configured to hierarchize the data to be transmitted into a plurality of layers according to at least one of a number of multiplexed codes in CDMA (Code Division Multiple Access), a coding unit of error correction codes, and an information block number, and to transmit the hierarchized data.

Preferably, the signal transmitting device further comprises a selection unit configured to select at least one of the number of multiplexed codes, the coding unit of error correction codes, and the information block number for dividing the data to be transmitted into a plurality of layers.

According to a third aspect of the present invention, there is provided a communication system, comprising: a signal transmitting device that hierarchizes data to be transmitted and transmits the hierarchized data; and a signal receiving device that receives the hierarchized data from the transmitting device, wherein the signal transmitting device comprises a data hierarchizing and transmitting unit configured to hierarchize the data to be transmitted into a plurality of data layers, and to transmit the data layers; and the signal receiving device comprises: a layer identifying unit configured to identify the data layers transmitted from the signal transmitting device; and a hierarchized data receiving unit configured to select the identified data layers according to at least one of receiving capability and a propagating environment of the signal receiving device, and to receive the selected data layers.

According to a fourth aspect of the present invention, there is provided a method of a communication system including a signal transmitting device for hierarchizing data to be transmitted and transmitting the hierarchized data and a signal receiving device for receiving the hierarchized data from the transmitting device, the method comprising the steps of: dividing, by the signal transmitting device, the data to be transmitted into a plurality of data layers and transmitting the data layers; and identifying, by the signal receiving device, the data layers transmitted from the signal transmitting device; and selecting, by the signal receiving device, the identified data layers according to at least one of receiving capability and a propagating environment characteristic of the signal receiving device, and receiving the selected data layers.

According to the present invention, the signal transmitting device uses different modulation schemes, numbers of multiplexed codes, coding units of error correction codes, or information block numbers as identifiers of data layers for hierarchizing the data to be transmitted, and transmits the hierarchized data. The signal receiving device selects data layers according to receiving capability such as receiving buffer size, calculation method, amount of calculations, and a propagating environment of the signal receiving device, and to receive the selected data layers. Therefore, it is possible to reduce the data delay in the hierarchized data at the transmitting end, and adaptively select and receive desired data.

These and other objects, features, and advantages of the present invention will become more apparent from the following detailed description of the preferred embodiments given with reference to the accompanying drawings.

DESCRIPTION OF THE PREFERRED EMBODIMENTS

Below, preferred embodiments of the present invention are explained with reference to the accompanying drawings.

Figure 1:
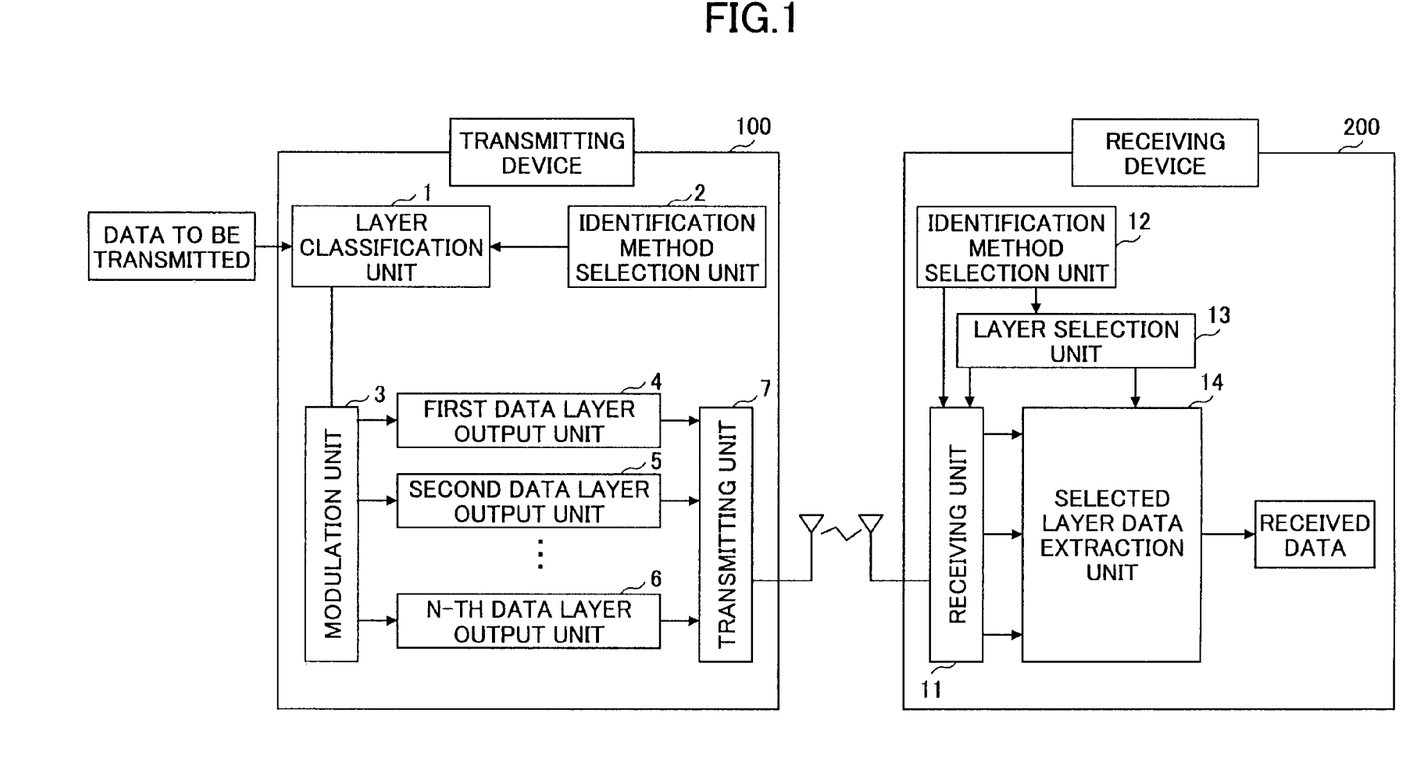
FIG. 1 is a block diagram showing an example of a configuration of a communication system according to an embodiment of the present invention.

FIG. 1 is a block diagram showing an example of a configuration of a communication system according to an embodiment of the present invention.

As shown in FIG. 1, the communication system includes a transmitting device 100 and a receiving device 200.

The transmitting device 100 includes a layer classification unit 1, an identification method selection unit 2, a modulation unit 3, a first data layer output unit 4, a second data layer output unit 5, an N-th data layer output unit 6, and a transmitting unit 7.

The receiving device 200 includes a receiving unit 11, an identification method selection unit 12, a layer selection unit 13, and a selected layer data extraction unit 14.

Next, referring to FIG. 1, explanations are made of the operations of the transmitting device 100 performing data hierarchization and the receiving device 200 receiving the hierarchized data according to the present invention.

[Operation of Transmitting Device 100]

The data to be transmitted by the transmitting device 100 are first input to the layer classification unit 1, and are classified with identifiers determined by the identification method selection unit 2. The identifiers may be made in connection with modulation schemes used by the transmitting device 100, code numbers of multiplexed radio frames in CDMA (Code Division Multiple Access), coding units of the error correction codes, or information block numbers. Here, for simplicity of explanation, it is assumed that the data layer identifier is in correspondence with modulation schemes used by the transmitting device 100.

After the layer classification unit 1 receives a notification from the identification method selection unit 2 indicating that the modulation schemes (for example, 16 QAM and QPSK) are to be used as identifiers of data layers, the layer classification unit 1 classifies the data to be transmitted into data A consisting of a bit sequence containing the first bit to the n-th bit, data B consisting of a bit sequence containing the (n+1)-th bit to the m-th bit. For example, if the data to be transmitted are ABCDEFGHIJKLabcdefghijkl, assuming an alphabetic character is represented by one bit, the bit sequence ABCDEFGHIJKL is specified to be data A, and the bit sequence abcdefghijkl is specified to be data B. The layer classification unit 1 specifies data A as the first layer, and data B as the second layer, and outputs the data layers to the modulation unit 3. If the modulation unit 3 uses 16 QAM to modulate the data layers, as each symbol in 16 QAM consists of four bits, the first two bits in each symbol form the first layer (data A), the second two bits form the second layer (data B), and data A and data B are modulated separately.

If the modulation unit 3 uses QPSK to modulate the data layers, as each symbol in QPSK consists of two bits, the first two bits in each symbol, that is, the first layer (data A) are modulated.

Consequently, in both signal spaces of 16 QAM and QPSK, the data to be transmitted are hierarchized into a layer structure having the same coordinates. This is called "hierarchical modulation".

After the hierarchical modulation, the data to be transmitted become: ABabCDcdEFefGHghIJijKLkl.

The layer-modulated data are output from the modulation unit 3, and are input to corresponding data layer output units. Here, the first layer data are input to the first data layer output unit 4, and the second layer data are input to the second data layer output unit 5.

The first data layer output unit 4 and the second data layer output unit 5 transform the format of the input data, and output the data to the transmitting unit 7. The transmitting unit 7 converts the data received from the first data layer output unit 4 and the second data layer output unit 5 into radio frequency signals, and transmits the signals.

Figure 2:
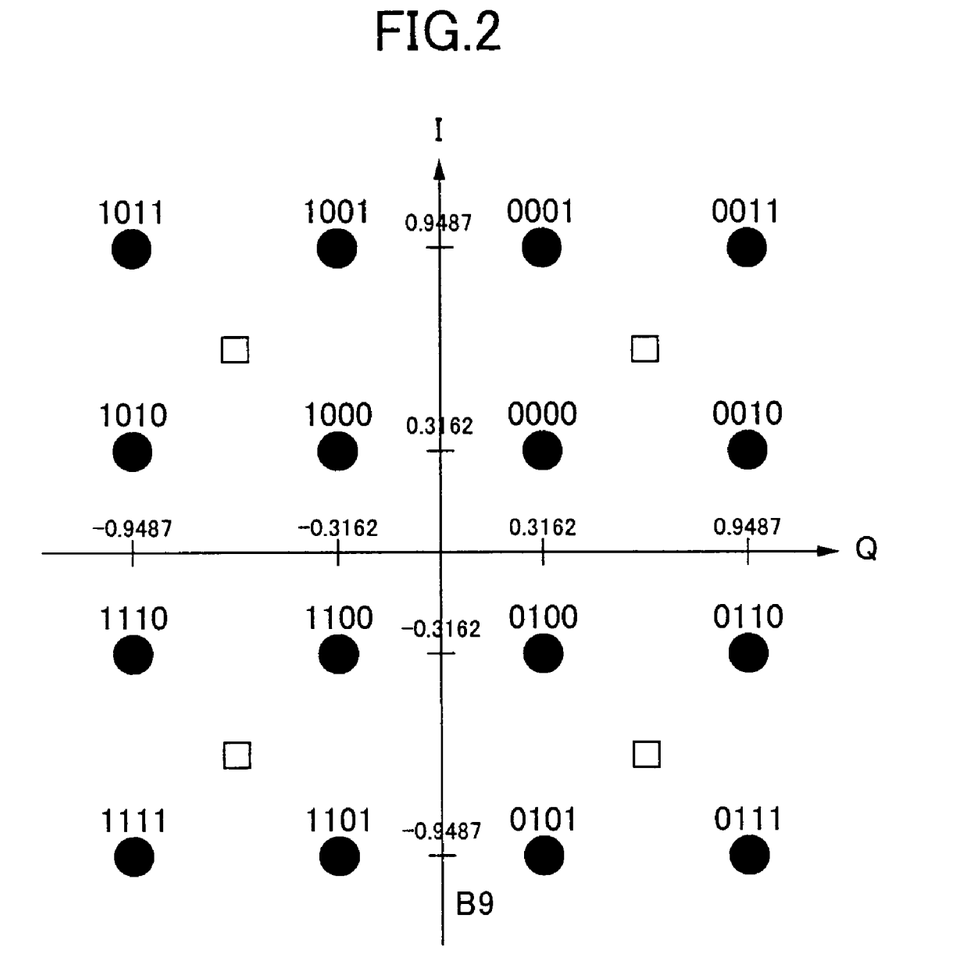
FIG. 2 is a signal space diagram showing an example of the constellation points of the data to be transmitted from the transmitting device 100.

FIG. 2 is a signal space diagram showing an example of the constellation points of the data to be transmitted from the transmitting device 100, specifically, showing the constellation points when hierarchizing the data to be transmitted using 16 QAM and QPSK.

As shown in FIG. 2, the four points (represented by solid circles) in the first quadrant of 16 QAM (0000, 0001, 0010, 0011) correspond to the two-bit point (00) (represented by an open square) in the QPSK signal space, and are mapped to the two-bit point (00) at a phase of $\pi/4$.

Similarly, the four points (represented by solid circles) in the second quadrant of 16 QAM (1000, 1001, 1010, 1011) correspond to the point (10) (represented by an open square) in the QPSK signal space, and are mapped to the two-bit point (10) at a phase of $3\pi/4$. The four points (represented by solid circles) in the third quadrant of 16 QAM (1100, 1101, 1110, 1111) correspond to the point (11) (represented by an open square) in the QPSK signal space, and are mapped to the two-bit point (11) at a phase of $-3\pi/4$. The four points (represented by solid circles) in the fourth quadrant of 16 QAM (0100, 0101, 0110, 0111) correspond to the point (01) (represented by an open square) in the QPSK signal space, and are mapped to the two-bit point (01) at a phase of $-\pi/4$.

[Operation of Receiving Device 200]

In the following description, it is assumed that the receiving unit 11 of the receiving device 200 is capable of demodulation using 16 QAM and QPSK.

The receiving unit 11 receives the data transmitted from the transmitting device 100, and identifies the data using the identifiers specified by the identification method selection unit 12, and receives and demodulates data of the layer selected by the layer selection unit 13. For example, if the identification method selection unit 12 specifies that 16 QAM be used to identify the data transmitted from the transmitting device 100, the identification method selection unit 12 notifies the receiving unit 11 and the layer selection unit 13 of the specification.

The layer selection unit 13 selects data layers to be received so as to enable the receiving unit 11 to receive the hierarchized data, and then informs the receiving unit 11 of the selection. In this embodiment, since 16 QAM is specified to be used for demodulation, the layer selection unit 13 selects the first layer and the second layer as the layers to be received. Therefore, the receiving unit 11 receives four bits per symbol to demodulate data in the first layer and the second layer.

After data in the first layer and the second layer are demodulated, the receiving unit 11 sends data in the first layer and the second layer to the selected layer data extraction unit 14. The selected layer data extraction unit 14 extracts data in the two layers and multiplexes them. Therefore, the original data sequence is reproduced.

In this embodiment, it is described above that the receiving capability of the receiving unit 11 covers the demodulation capability of the receiving unit 11 (16 QAM, or QPSK, and others). If the receiving unit 11 is capable of demodulation using only QPSK, the identification method selection unit 12 may specify QPSK to be used for identification of data layers, and notifies the receiving unit 11 and the layer selection unit 13 of the specification.

In this case, the layer selection unit 13 selects only the first data layer as the layer to be received, and hence, the receiving unit 11 receives the first two-bit data of each symbol (the first layer) and demodulates the data. The subsequent processing is the same as the above.

According to the present embodiment, if the receiving unit 11 is capable of demodulation using 16 QAM and QPSK, one of 16 QAM and QPSK is selected for demodulation, and data are demodulated by using the selected demodulation scheme. If the receiving unit 11 is capable of demodulation using only QPSK, only the first data layer is selected, or in other words, the data layer to be received is limited to the first data layer, and data are demodulated by using QPSK.

For example, consider a case in which the transmitting device 100 sends reports from a newspaper to the receiving device 200 by the method of the present invention as described above.

Figure 3A:
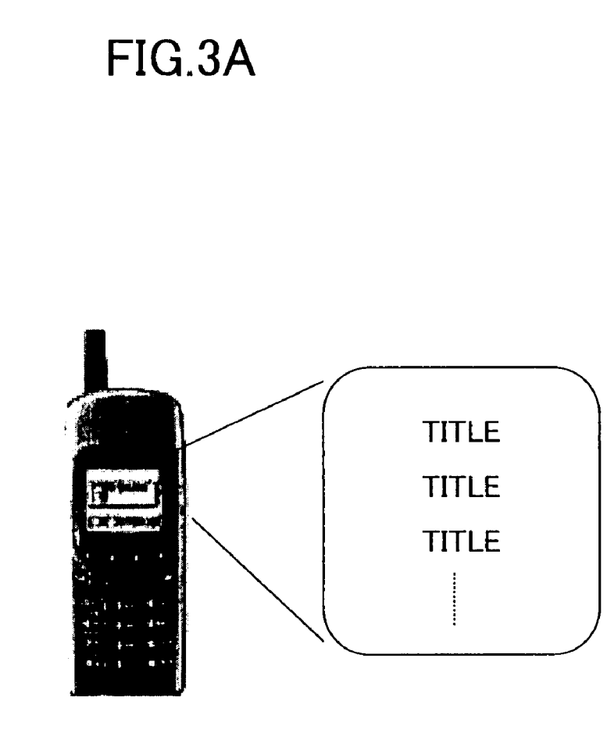
FIGS. 3A and 3B are views showing an application of transmission of hierarchized data.
Figure 3B:
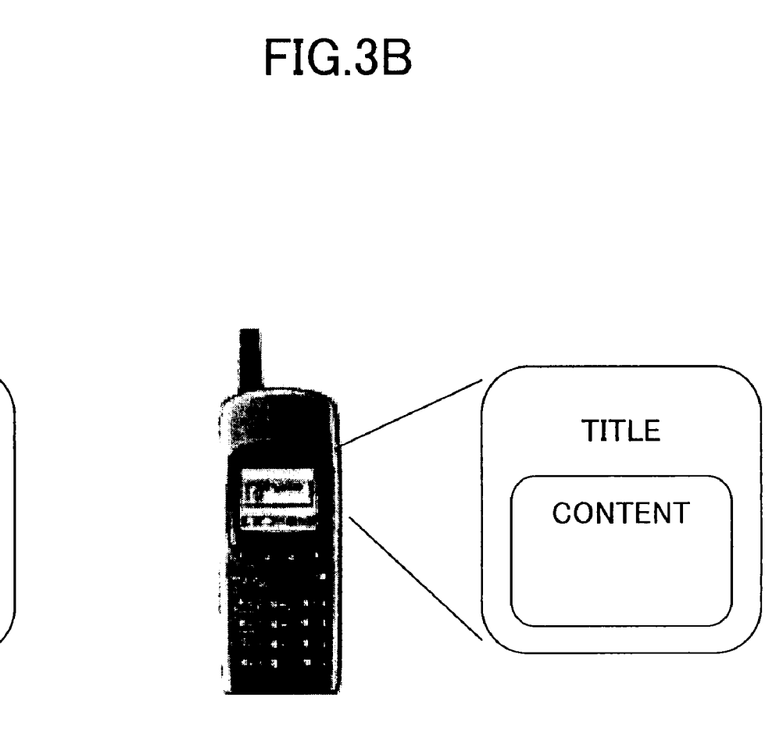

FIGS. 3A and 3B are views showing an application of transmission of hierarchized data.

In this case, the transmitting device 100 modulates the data of the reports in such a way that the titles of the reports are contained in the sequence formed by the first two bits (the first layer) of each symbol, and the contents of the reports are contained in the sequence formed by the second two bits (the second layer) of each symbol. Then, the transmitting device 100 transmits these modulated data.

When the receiving device 200, for example, a cellular phone, or another mobile terminal, is configured to select the first data layer from the data transmitted by the transmitting device 100, the receiving device 200 only selects the titles of the reports, as shown in FIG. 3A. When the receiving device 200 is configured to select both the first data layer and the second data layer, the receiving device 200 selects the titles and contents of the reports, as shown in FIG. 3B.

In this way, since the receiving device 200 is capable of adaptive data reception, it is possible to improve the efficiency of data reception. In the above application example, since QPSK and 16 QAM can be used for demodulation, data are hierarchized into two layers. If QPSK and 64QAM, or QPSK and 256QAM are used for demodulation, it is possible to hierarchize the data into more data layers.

It should be noted that in the above description the data layer to be received is selected based on the capability of demodulation of the receiving device 200, but the present invention is not limited to this embodiment. For example, it is possible to select data layers based on the buffer size of the receiving device 200 for accommodating the received data. Specifically, as many as possible data layers can be selected within the processing limit of the receiving buffer size.

In addition, it is possible to select data layers based on calculation capability of the receiving device 200, for example, number of bits and number of codes in each processing, or computation method. Specifically, as many as possible data layers can be selected within the calculation capability.

Further, it is possible to select data layers in response to variation caused by propagation loss and fading in communication propagating channels.

In the above description, methods of modulation are used to identify data layers; certainly other methods can also be used for data layer identification. For example, use can be made of a number of multiplexed codes in CDMA, coding unit of the error correction codes, and information block number for data layer identification.

Below, an explanation is made of the case in which the number of the multiplexed codes in CDMA is used for data layer identification.

In CDMA, in order to realize high speed data communication, a number of M codes are assigned to each user (M is an integer not less than two), and the number of M codes are multiplexed for transmission. In the description below, it is assumed that the number of the multiplexed codes (M) along a certain time axis is four, namely, four codes (code 1 through code 4) are multiplexed for transmission, and each code is capable of accommodating data of six bits. In addition, the four codes are classified into a first layer containing code 1 and code 2 and a second layer containing code 3 and code 4.

Therefore, the aforementioned data to be transmitted "ABCDEFGHIJKLabcdefghijkl" are multiplexed in the following way.

| Code number | data |
|---|---|
| Code 1 | ABCDEF |
| Code 2 | GHIJKL |
| Code 3 | abcdef |
| Code 4 | ghijkl |

The receiving device 200 receives the code-multiplexed data, and selects layers by specifying the code numbers.

Below, an explanation is made of the case in which the coding unit of the error correction codes is used for data layer identification.

The error correction codes are used in cable and radio communications to detect errors in communication data caused by noise in the communication lines, attenuation of the signals, and other reasons, and to correct the errors using additional codes. The error correction codes may be formed by block codes, convolutional codes, or turbo codes, which are used in a vast field including mobile communications and digital broadcasting and known as codes of high performance and high reliability.

For example, in coding of an input signal by the convolutional codes, the input signal is divided into blocks each consisting of a certain number of bits, and the input signal is coded in units of blocks, that is, the coding unit. Therefore, when the error correction codes are coded in the coding unit, the data to be transmitted may be hierarchized into layers according to the coding unit. On the decoding side, data layers can be selected if data for identifying layers using a decoding unit, for example, blocks, can be extracted.

Below, an explanation is made of the case in which the information block number is used for data layer identification.

An information block number is a number assigned to a unit of data to be transmitted; the unit of the transmission data is a block of data of a certain length. When using the information block number to identify data layers, the transmission data are hierarchized into layers with each layer corresponding to an information block number. For example, if a data block contains twelve bits, the aforementioned data "ABCDEFGHIJKLabcdefghijkl" are divided into two blocks in the following way:

Block 1: ABCDEFGHIJKL

Block 2: abcdefghijkl, wherein block 1 forms the first data layer, and block 2 forms the second data layer. The receiving device 200 receives the layered data according to the information block numbers, and selects data layers by specifying the information block numbers.

As described above, according to the present embodiment, data layers can be identified by other various methods in addition to the modulation scheme. Therefore, it is possible to select one of the above various methods to hierarchize the data to be transmitted.

Figure 4A:
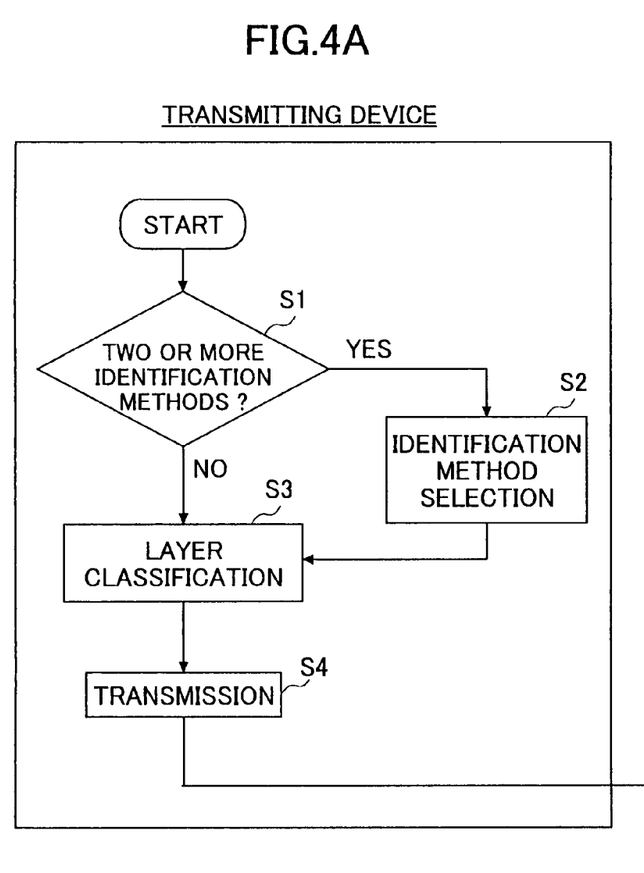
FIGS. 4A and 4B are flowcharts showing the operations of the transmitting device 100 and the receiving device 200 involving selection of data layer identification methods.
Figure 4B:
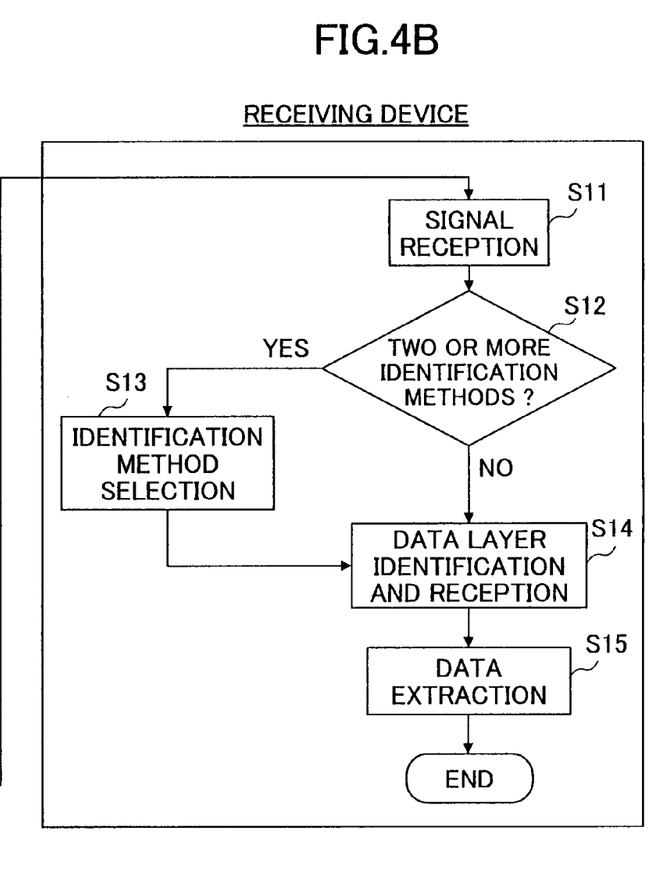

FIGS. 4A and 4B are flowcharts showing the operations of the transmitting device 100 and the receiving device 200 involving selection of data layer identification methods.

The flowchart in FIG. 4A shows the operations of the transmitting device 100.

In step S1, the identification method selection unit 2 determines if two or more data identification methods are available.

In step S2, if two or more data identification methods are available, the identification method selection unit 2 selects one of them, and notifies the layer classification unit 1 of the selection. For example, if modulation scheme and coding unit of error correction codes are available for data identification, the identification method selection unit 2 selects one of them.

In step S3, the layer classification unit 1 classifies the transmission data based on the identification method selected by the identification method selection unit 2, and outputs the data layers to the modulation unit 3. After the hierarchical modulation on the transmission data, the modulation unit 3 outputs the layer-modulated data to the corresponding data layer output units (here, the first data layer output unit 4 and the second data layer output unit 5).

In step S4, the corresponding data layer output units transform the format of the input data and output the data to the transmitting unit 7. The transmitting unit 7 converts the received data to radio frequency signals and transmits the signals.

If it is determined that only one data identification method is available in step S1, the identification method selection unit 2 notifies the layer classification unit 1 of the data identification method. Further, when only one data identification method is available, the layer classification unit 1 may identify the data identification method by itself in advance.

The layer classification unit 1 classifies the transmission data using the identification method as shown in step 3, and outputs the data layers to the modulation unit 3. The subsequent steps are the same as those described above.

The flowchart in FIG. 4B shows the operations of the receiving device 200.

In step S11, the receiving unit 11 receives the data transmitted from the transmitting device 100.

In step S12, the identification method selection unit 12 determines if two or more data identification methods are available.

In step S13, if two or more data identification methods are available, the identification method selection unit 2 selects one of them, and notifies the receiving unit 11 and the layer selection unit 13 of the selection.

The layer selection unit 13 selects data layers to be received according to the receiving capability of the receiving unit 11, and then informs the receiving unit 11 of the selection. For example, if demodulation is performed by using only QPSK, the layer selection unit 13 selects the first data layer and then informs the receiving unit 11 of the selection. If demodulation is performed by using only 16 QAM, the layer selection unit 13 selects the first data layer and the second data layer, and then informs the receiving unit 11 of the selection.

In step S14, the receiving unit 11 identifies the input data using the identification method selected by the identification method selection unit 12, and receives the data of the layers selected by the layer selection unit 13.

In step S15, the receiving unit 11 sends the received data layers to the selected layer data extraction unit 14. The selected layer data extraction unit 14 performs error correction for the selected data layers, and extracts and outputs the desired data.

If it is determined that only one data identification method is available in step S12, the identification method selection unit 12 notifies the receiving unit 11 and the layer selection unit 13 of the method. The layer selection unit 13 selects data layers to be received according to the receiving capability of the receiving unit 11, and then informs the receiving unit 11 of the selection. Further, when only one data identification method is available, the layer selection unit 13 may identify the data identification method by itself in advance. Then the receiving unit 11 identifies the input data using the identification method selected by the identification method selection unit 12, and receives the data of the layers selected by the layer selection unit 13. The subsequent steps are the same as those described above.

As described above, on the signal transmitting side, the signal transmitting device uses different modulation schemes, such as numbers of multiplexed codes, coding units of error correction codes, or information block numbers as identifiers of data layers, to hierarchize the data. On the signal receiving side, the signal receiving device selects data layers according to receiving capability such as decoding method, receiving buffer size, calculation methods, amount of calculations, and propagating environments of the signal receiving device, and to receive the selected data layers. Therefore, it is possible to reduce the data delay in the hierarchized data at the transmitting end, and adaptively select and receive desired data.

Further, in communication systems such as broadcasting or multicasting systems, in which the transmitting side transmits data according to an arbitrary time schedule, by providing data layers each containing a receivable amount of data along the same time axis, it is possible to reduce the work of re-sending data and reduce the buffer size.

While the present invention has been described with reference to specific embodiments chosen for purpose of illustration, it should be apparent that the invention is not limited to these embodiments, but numerous modifications could be made thereto by those skilled in the art without departing from the basic concept and scope of the invention.

For example, in the above description, the identification method selection unit 12 of the receiving device 200 selects the method of identifying data layers, but the present invention is not limited to this embodiment. For example, the identification method selection unit 2 of the transmitting device 100 may select the identification method, and the transmitting unit 1 of the transmitting device 100 may send information of the selected method.

In the above description, the layer classification unit 1 and the identification method selection unit 2 of the transmitting device 100 correspond to the hierarchized data transmitting unit in the claims, the receiving unit 11 and the identification method selection unit 12 of the receiving device 200 correspond to the layer identifying unit in the claims, and the layer selection unit 13 and the selected layer data extraction unit 14 correspond to the hierarchized data receiving unit in the claims.

Summarizing the effect of the invention, on the signal transmitting side, the signal transmitting device uses different modulation schemes, numbers of multiplexed codes, coding units of error correction codes, or information block numbers as identifiers of data layers, to hierarchize the data. On the signal receiving side, the signal receiving device selects data layers according to receiving capability such as decoding method, receiving buffer size, calculation method, amount of calculations, and propagating environment of the signal receiving device, and to receive the selected data layers. Therefore, it is possible to reduce the data delay in the hierarchized data at the transmitting end, and adaptively select and receive desired data.

This patent application is based on Japanese Priority Patent Application No. 2002-291572 filed on Oct. 3, 2002, the entire contents of which are hereby incorporated by reference.

What is claimed is:

1. A signal receiving device for receiving data hierarchized by a signal transmitting device, the signal receiving device comprising:
   a layer identifying unit configured to identify data layers transmitted from the signal transmitting device; and
   a hierarchized data receiving unit configured to select the identified data layers according to one or more of a receiving buffer size of the signal receiving device, calculating capability of the signal receiving device, and a propagating environment characteristic of the signal receiving device, and to receive the selected data layers, wherein
   the hierarchized data receiving unit comprises a selection unit configured to select one or more of the receiving buffer size of the signal receiving device, the calculating capability of the signal receiving device, and the propagating environment of the signal receiving device for selecting the identified data layers.

2. A signal transmitting device for hierarchizing data to be transmitted and transmitting the hierarchized data, the signal transmitting device comprising:
   a hierarchized data transmitting unit configured to divide the data to be transmitted into a plurality of layers according to at least one of multiplexed codes in Code Division Multiple Access, a coding unit of error correction codes, and an information block number, and to transmit the hierarchized data; and
   a selection unit configured to select at least one of the number of multiplexed codes, the coding unit of error correction codes, and the information block number for dividing the data to be transmitted into a plurality of layers.

* * * * *